Feb. 2, 1960
J. J. KUESER
2,923,803
AUTOMATIC CORN POPPING APPLIANCE
Filed Dec. 17, 1956
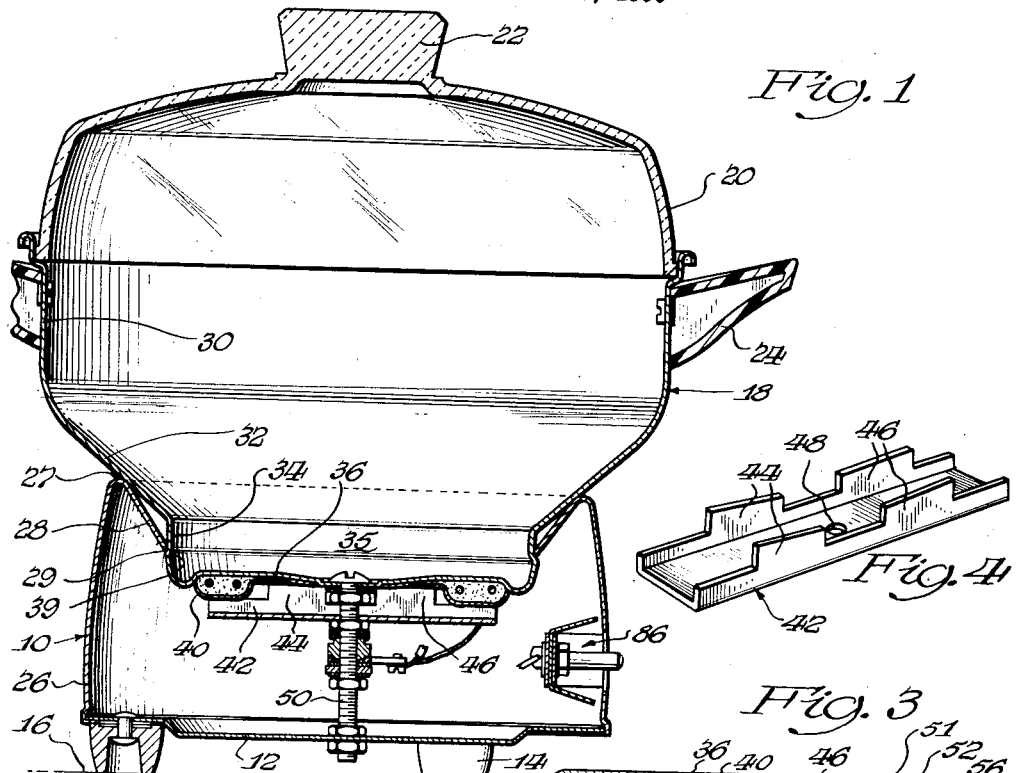
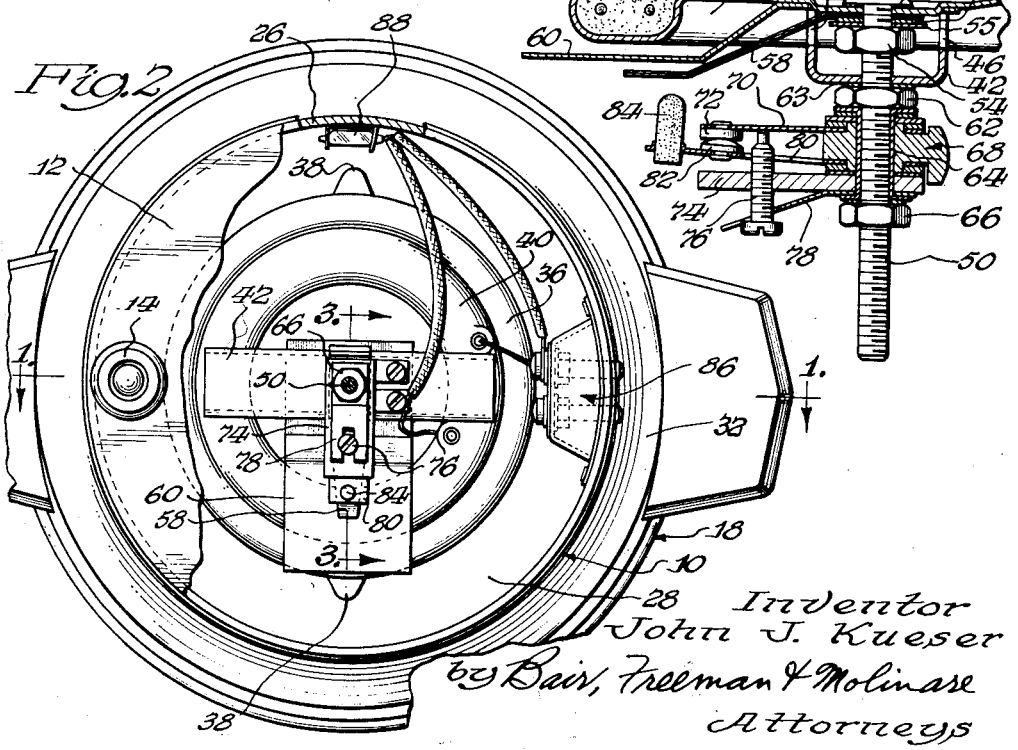
Inventor
John J. Kueser
by Bair, Freeman & Molinare
Attorneys

United States Patent Office 2,923,803
Patented Feb. 2, 1960

2,923,803

AUTOMATIC CORN POPPING APPLIANCE

John J. Kueser, St. Louis, Mo., assignor to Knapp-Monarch Company, a corporation of Delaware Application December 17, 1956, Serial No. 628,595

12 Claims. (Cl. 219—44)

This invention relates generally to an electrical appliance for popping corn, and more particularly to a novel corn popping appliance which is fully automatic in its operation.

Although electrical appliances for popping corn have been known in the past, as for example the corn popper disclosed in Gundelfinger et al. Patent No. 2,194,852, such devices have not embodied a practical and efficient temperature control for the popping cycle which would permit reliable operation in a fully automatic manner. The problem presented in popping corn is a highly specialized one, requiring a termination of the heat supply at a critical cut-off point which must be determined and sensed prior to full popping of the corn within the appliance, whereby the residual heat may be consumed in completion of the corn popping operation. Such a cycle of operation is essential in order to prevent burning or drying out of the popped corn and to maintain uniformity of successive operations, while at the same time effecting substantially complete popping of all of the kernels of raw corn charged into the appliance.

It is a primary object of this invention, therefore, to provide a fully automatic corn popping appliance.

It is another object of this invention to provide an electrical corn popping appliance having thermostatic control means operative to regulate the heat supply in accordance with the critical temperature cycle requirements for satisfactory corn popping.

It is a further object of this invention to provide novel means for mounting an electrical heating element and cooperating thermostatic device in a corn popping appliance, whereby maximum efficiency is achieved for sensing cooking temperature conditions and for effecting automatic control of the critical temperature cycle requirements for satisfactory corn popping.

With these and other objects in view, the invention consists in the construction, arrangement, and combination of the various parts of the automatic corn popping appliance whereby the objects contemplated are obtained as hereinafter more fully set forth, pointed out in the claims and illustrated in the accompanying drawing, wherein:

Figure 1 is a vertical cross sectional view of an automatic corn popping appliance embodying the principles and features of the present invention, taken substantially as indicated along the line 1—1 of Figure 2;

Figure 2 is a bottom plan view, with portions broken away to show details of internal construction, of the appliance of Figure 1;

Figure 3 is a fragmentary vertical cross sectional view, on an enlarged scale, taken substantially as indicated by the line 3—3 on Figure 2, showing the details of construction of the thermostatic control means and its cooperative mounting with the heating element below the cooking container; and Figure 4 is a perspective view of the retainer member for securing the heating element in operative position.

Referring now more particularly to the drawing, I have indicated generally at 10 a base housing having a bottom plate 12 secured thereto. A plurality of supporting legs 14 are bolted to the bottom plate 12, and serve to support and elevate the base housing 10 above a table top or like surface 16.

A cooking container, generally indicated at 18 is supported upon and nested within the base housing 10. The container 18 is formed of light gauge metal, preferably wrought aluminum. A cover 20, preferably transparent, and having a top handle 22 is positioned atop the container 18. Side handles 24 are carried by the container side wall to facilitate manual handling.

The base housing 10 comprises an annular side wall 26 of generally cylindrical shape, and an inwardly and downwardly extending top wall 28 of generally frusto-conical shape. The top wall 28 terminates in an inner edge 29 defining a central opening.

The container 18 is constructed in the specialized form for corn popping operation as disclosed in the said Gundelfinger et al. Patent No. 2,194,852, and comprises a peripheral side wall 30, a cone-shape bottom wall 32, a reduced diameter peripheral wall 34, and a bottom wall 36. The walls 34 and 36 serve to define a charge receiving well 35 in which the raw corn kernels and cooking oil are placed. During corn popping operation a charge of cooking oil and corn forming a popping charge is heated within the well 35. As the corn kernels expand and burst they are thrown upwardly by the bursting action into the upper portion of the container 18 defined by the side wall 30 and bottom wall 32. After a quantity of the corn has popped, it will start bridging across the cone-shaped bottom wall 32. In this way, the container 18 is shaped, arranged and positioned relative to the well portion 35 thereof to receive the corn as it is popped and to retain the popped corn therein in separated relation to the heated popping charge in the well.

The base top wall 28 is provided with a plurality of circumferentially spaced cut-outs 38, which serve to enable the edge 29 to be resiliently deformed in radially outward directions. The container wall 34 is provided with an outwardly enlarged shoulder 39. In this way, the container 18 may be inserted in nested relation within the base housing 10 by forcing the container wall 34 downwardly through the opening defined by the base top wall 29, so as to resiliently enlarge the base opening until shoulder 39 has passed therebelow and the edge 29 has "snapped back" into locking engagement over the shoulder 39. When thus positioned, as seen in Figure 1 of the drawing, the container bottom wall 32 will be supported upon the top annular edge 27 between the base side wall 26 and top wall 28.

The container bottom wall 36 is upwardly recessed to receive an annular heating element 40 thereagainst. The element 40 is of a well-known cast or extruded type, and is generally flattened in form so as to provide a substantial contact surface adapted to seat directly against the container bottom wall. As best seen in Figures 1 and 4, a channel-shaped retainer or clamping member 42 is provided to mount the heating element 40 in tight contacting engagement with the bottom wall 36. The member 42 provides the two pairs of upwardly extending abutment shoulders 44 and 46 formed as integral portions of the channel sides. An aperture 48 is provided centrally of the retainer member bottom wall.

A mounting stud 50 extends downwardly through a suitable aperture in the container bottom wall 36, with its head 51 in seated engagement thereabove upon a sealing washer 52. The elongated shank portion of the stud 50 extends downwardly through the retainer member 42 and its aperture 48. The shank portion of the stud 50 is suitably screw-threaded, and receives an upper lock nut 54 intermediate the retainer member 42 and the bottom surface of the container wall 36, as best seen in Figure 3.

A contact washer 55 and an insulating washer 56 of mica or the like are provided so that the lock nut 54 may be tightened against the container bottom wall 36 to rigidly support a bi-metal element 58. The space between the adjacent pairs of channel shoulders 44 and 46 provides a clearance through which the bi-metal 58 extends outwardly and downwardly. In this way, the bi-metal element 58 is maintained in direct heat transfer engagement against the container bottom wall 36. An insulating baffle 60 is wedged between the retainer member 42 and the container bottom wall 36, and serves to overlie and insulate the bi-metal 58 from the heating element 40. It will be apparent that the outer ends of the retainer member 42 engage and support the heating element 40 in tight contacting engagement against the container bottom wall 36. The pairs of shoulders 44 and 46 provide supplemental contacting engagement against the container bottom wall 36, thereby preventing downward distortion of the container bottom wall 36 upon tightening of the mounting stud 50 and cooperating lock nuts to effect parts assembly.

An intermediate lock nut 62 and cooperating lock washer 63 are threadedly received by the mounting stud shank below the bottom wall of the retainer member 42, and is tightened against the retainer member 42 so as to effect a high-torque compression of the heating element 40 against the container bottom wall 36. A thermostatic switch assembly is carried by the mounting stud 50 below the lock nut 62. An eyelet 64 is slideably received upon the mounting stud shank and held in tight engagement against the lock nut 62 by means of a lower lock nut 66. An insulator body 68 and cooperating switch stack assembly are carried by the eyelet 64, and provide a fixed resilient switch blade 70 having an electrical contact 72 at its outer end. A flange member 74 carried by the body 68 threadedly supports a calibration screw 76, adapted to engage the switch blade 70 and enable selective vertical positioning of the contact 72. A lock spring 78 is provided to exert a downward biasing force against the calibration screw 76, so as to insure maintenance of its selected position of adjustment during operation and normal handling of the appliance.

A movable resilient switch blade 80 is carried by the body 68 below the fixed switch blade 70, and provides a contact 82 intermediate its ends adapted to effect switch opening and closing cooperation with the fixed contact 72. The switch blade 80 carries an insulating rod 84 outwardly of the contact 82. The rod 84 is disposed closely adjacent and directly below the bi-metal element 58. It will be apparent that downward deflection of the bi-metal 58 in response to a pre-determined high temperature condition of the container bottom wall 36, will effect contacting engagement between the outer end of the bi-metal 58 and the upper rounded end of the insulating rod 84. Upon sufficient downward deflection, the movable switch blade 80 will be bent so as to effect a separating of the contacts 72 and 82, and consequent switch opening. Such deflection of the bi-metal 58 will occur when the container bottom wall 36 reaches a critical cut-off temperature for the corn popping cycle. Switch opening will then serve to de-energize the heating element 40. In this way, thermostatic regulation in response to container bottom wall temperature is effected.

In developing a fully automatic corn popping appliance, it is necessary to achieve thermostatic control in a manner which will not result in a burning of the popped corn kernels, and which will not be subjected to variations in the popping control action when successive loads of corn are to be popped with only short time intervals between loads. Several important factors must be satisfied in order to achieve a successful appliance of this type capable of fully automatic and reliable operation.

Any excessive thermal response lag between the thermostatic control and the cooking container must be avoided. In the present invention the thermal lag factor is effectively minimized through the use of a container made of light gauge wrought aluminum, and by using a thermostatic switch stack assembly having a bi-metal element in direct flat contact against the bottom surface of the container and maintained in a tight engagement by means of a high torque compressive stacking. In this way, a minimum of thermal mass and a maximum area of direct flat contact is provided for heat transfer in a quick-response manner from the container to the switch-actuating bi-metal element. In addition, the substantial thermal mass of the stud 50 serves to directly transmit the heat of the cooking oil and corn within the well 35 from its head 51 and adjacent shank portion to the bi-metal element 58.

The horizontal area of the container bottom must be substantially smaller than at higher levels in the container, so as to insure a concentration of the raw kernels and the cooking oil within the control zone where thermal energy is applied and temperatures are directly sensed. In this way, improved control of the popping action is further insured.

It is also important to employ a measured amount of cooking oil with each load of raw corn, so as to cover the kernels and effect a more uniform heat transfer to all of them. As the oil is gradually absorbed into the popped kernels, which fly upwardly out of the container bottom well, the mass of material being heated becomes substantially less, thereby enabling the temperature at the container bottom wall to rise accordingly. Because of this pecularity of reduction in the mass being cooked, characteristic of corn popping, it is possible to select a thermostatic cut-off point prior to completion of the popping operation.

The thermostatic control means of the present invention, therefore, is calibrated so that the heating element will be de-energized prior to the completion of the popping action for any given load. The latent heat available in the container bottom well serves to complete the popping action of the remaining kernels, and is insufficient to effect a burning of either the popped or unpopped kernels in the event that the popped load is not immediately removed from the appliance. I have found that the thermostatic control should be adjusted so as to effect automatic cut-off when about two-thirds of the cooking load has been popped. In order to insure thermostatic cut-off at the proper time for each load of corn to be popped, it is only necessary to use the same predetermined amount of oil and the same amount of corn for each cycle. This may be readily insured by providing a suitable measuring cup for charging the appliance, or by marking a suitable level on the appliance itself.

The thermostatic switch is connected in series with the heating element 40, and is adapted to receive a power supply from a suitable cord receptacle or the like 86 in the conventional manner of electrical appliances. An indicator lamp 88 is mounted within the base 10 so as to be externally visible through a suitable aperture in the base side wall 26. The lamp 88 is connected in parallel with the heating element 40, so that at the start of each popping load, the lamp 88 will glow as the oil and corn are heating and during the first two-thirds of popping operation, that is until the heating element is thermostatically cut off. In this way, the user will be signalled by cut-off of the lamp that the popping cycle is nearing completion, and that preparations for removal of the popped corn and possible charging of a new load should be made. When the appliance is at room temperature, the total popping time for a normal first load is about 6½ minutes. Thermostatic cut-off, dependent upon the mass of material being popped and not upon the total time of the cooking cycle, will occur at approximately one minute prior to completion of the popping operation. On successive loads, the total cooking cycle will be substantially shorter because of the initial warm temperature of the appliance, but thermostatic cut-off will still take place at the same point, or at about the beginning of the last minute of popping. In this way, a uniform quality of popped corn is always provided regardless of the total time required for the popping cycle.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An automatic electrical corn popping appliance, comprising a container for popped corn, a well at the bottom of said container for receiving a charge of cooking oil and corn forming a popping charge, an electric heating element, means for mounting said heating element in intimate thermal contact with the bottom of said container well, said heating element serving when energized to transmit heat to the popping charge and raise its total mass to a sufficient temperature for corn popping, said mounting means including a clamping member and a connector stud, said clamping member being generally channel-shaped and having cut away side portions defining spaced legs, said connector stud extending through said well bottom and through said clamping member intermediate its legs, portions of said clamping member adjacent its legs serving to support said heating element in contacting engagement with said well bottom, said legs serving to engage said well bottom and prevent distortion thereof upon full tightening of said stud against the channel, and thermostatic control means carried on said connector stud and directly responsive to the temperature of the popping charge in said well, said popping charge being characterized by a progressively decreasing mass within said well after the initial charge mass has reached popping temperature because of self-removal of corn and absorbed oil from said well as a result of popping action, said control means being operative to effect de-energization of said heating element in response to a predetermined increase in the popping charge temperature because of a corresponding reduction in its mass when substantially less than the full amount of said popping charge has been popped, whereby said heating element is maintained in tight engagement against said well bottom throughout the heating cycles of the appliance to insure uniform automatic regulation of cut-off.

2. An automatic electrical corn popping appliance, comprising a container for popped corn, a well at the bottom of said container for receiving a charge of cooking oil and corn forming a popping charge, an electric heating element, means for mounting said heating element in intimate thermal contact with the bottom of said container well, said heating element serving when energized to transmit heat to the popping charge and raise its total mass to a sufficient temperature for corn popping, said mounting means including a clamping member and a connector stud, said clamping member being generally channel-shaped and having cut away side portions defining spaced legs, said connector stud extending through said well bottom and through said clamping member intermediate its legs, portions of said clamping member adjacent its legs serving to support said heating element in contacting engagement with said well bottom, said legs serving to engage said well bottom and prevent distortion thereof upon full tightening of said stud against the channel and thermostatic control means including a bi-metal element directly responsive to the temperature of the popping charge in said well, said popping charge being characterized by a progressively decreasing mass within said well after the initial charge mass has reached popping temperature because of self-removal of corn and absorbed oil from said well as a result of popping action, said stud serving to maintain said bi-metal element in direct flat contact against said well bottom, said control means being operative to effect de-energization of said heating element in response to a predetermined increase in the popping charge temperature because of a corresponding reduction in its mass when substantially less than the full amount of said popping charge has been popped, whereby said heating element is maintained in tight engagement against said well bottom throughout the heating cycles of the appliance to insure uniform automatic regulation of cut-off.

3. An automatic electrical corn popping appliance, comprising a container for popped corn, a well at the bottom of said container for receiving a charge of cooking oil and corn forming a popping charge, an electric heating element, means for mounting said heating element in intimate thermal contact with the bottom of said container well, said heating element serving when energized to transmit heat to the popping charge and raise its total mass to a sufficient temperature for corn popping, said mounting means including a clamping member and a connector stud, said clamping member being generally channel-shaped and having cut away side portions defining spaced legs, said connector stud extending through said well bottom and through said clamping member intermediate its legs, portions of said clamping member adjacent its legs serving to support said heating element in contacting engagement with said well bottom, said legs serving to engage said well bottom and prevent distortion thereof upon full tightening of said stud against the channel, said stud having a portion extending within said well, and thermostatic control means including a bi-metal element directly responsive to the temperature of the popping charge in said well, said popping charge being characterized by a progressively decreasing mass within said well after the initial charge mass has reached popping temperature because of self-removal of corn and absorbed oil from said well as a result of popping action, said stud serving to maintain said bi-metal element in direct flat contact against said well bottom and to directly conduct heat from within said well to said bi-metal element, said control means being operative to effect de-energization of said heating element in response to a predetermined increase in the popping charge temperature because of a corresponding reduction in its mass when substantially less than the full amount of said popping change has been popped, whereby said heating element is maintained in tight engagement against said well bottom throughout the heating cycles of the appliance to insure uniform automatic regulation of cut-off.

4. An automatic electrical corn popping appliance comprising a container for popped corn, a well at the bottom of said container for receiving amounts of cooking oil and corn forming a popping charge, an electric heating element in intimate thermal contact with said well, said heating element serving when energized to transmit heat to the popping charge and to raise the temperature of the popping charge to a corn popping temperature, thermostatic control means including a temperature sensing element directly responsive to the temperature of the popping charge in said well, said popping charge being characterized by a progressively decreasing mass within said well after the initial charge mass has reached popping temperature because of self-removal of corn and absorbed oil from said well as a result of popping action, control means operative to effect deenergization of said heating element in response to a predetermined increase in the temperature of the popping charge because of a corresponding reduction in the charge's mass when substantially less than the full amount of said popping charge has been popped, and mounting means for securing the heating element in intimate thermal contact with said well and for effecting response of the thermostatic control means to the temperature of the popping charge in said well, said mounting means including a connector stud extending through said well bottom and projecting below the bottom of the well, means on said connector stud effecting direct thermal sensing between said temperature sensing element and the heated charge mass in said well, and clamping means including a force-applying member adjustable along said connector stud, for engaging said heating element to force it into intimate thermal contact with the well.

5. A device as set forth in claim 4 wherein said heating element is annular and wherein said clamping means includes an elongated clamping member engaging generally diametrically located portions of said heating element and being positioned to be biased against said heating element by said adjustable force-applying member.

6. A device as set forth in claim 4 wherein said heating element is annular and wherein said clamping means includes an elongated clamping member engaging generally diametrically located portions of said heating element and being positioned to be biased against said heating element by said adjustable force-applying member, and said elongated clamping member having well-engaging portions thereof which engage the well bottom inwardly of said annular heating element and cooperate with said well bottom to prevent distortion thereof when clamping force is applied by said force-applying member.

7. A device as set forth in claim 4 including means for shielding the temperature sensing element from the heating element.

8. A device as set forth in claim 4 wherein the temperature sensing element is an elongated bimetal carried at one end thereof on said connector stud in direct contact with the well bottom, and the clamping means includes an elongated channel-shaped clamping member carried on said connector stud and having leg portions thereof engaging the well bottom, and one of the legs of the channel-shaped clamping member being apertured through which extends the elongated bimetal radially of said connector stud and transverse to said clamping member.

9. A device as set forth in claim 4 wherein said thermostatic control means also includes an adjustable stack switch carried on the said connector stud.

10. An automatic electrical corn popping appliance for properly popping, without burning, one or a consecutive series of popping charges, consisting of preselected amounts of cooking oil and corn, and without regard to the initial temperature of the appliance into which any popping charge is introduced; said automatic corn popping appliance comprising, in combination: a corn popping container including a reduced well at the bottom of the container for receiving therein the popping charge, a popped-corn receiving portion of much greater volume than the volume of said well located above the well and being shaped and arranged relative to said well to receive the corn as it is popped and to retain therein the popped corn in separated relation to the popping charge in said well, and an electric heating element serving, when energized, to transmit heat to the popping charge, to raise the temperature of said popping charge to a corn popping temperature, and to effect further increase in the temperature of the popping charge as the mass of popping charge decreases, the said popping charge being characterized by a progressively decreasing mass within said well, after the initial mass of popping charge has reached popping temperature, because of self-removal of corn and absorbed cooking oil from said well as a result of the corn-popping action; and a thermostatic control for said heating element, responsive primarily to the temperature of the diminishing mass of popping charge in said well, for anticipating the time of complete removal of popping charge from said well and for terminating energization of said heating element prior to complete removal of the popping charge from the well, to prevent subsequent burning of the popped corn, and while the residual heat from the heating element and in the popping charge effects the popping of the last portion of the popping charge in the well.

11. An automatic electrical corn popping appliance for properly popping, without burning, one or a consecutive series of popping charges, consisting of preselected amounts of cooking oil and corn, and without regard to the initial temperature of the appliance into which any popping charge is introduced; said automatic corn popping appliance comprising, in combination: a corn popping container including a reduced well at the bottom of the container for receiving therein the popping charge, a popped-corn receiving portion of much greater volume than the volume of said well located above the well and being shaped and arranged relative to said well to receive the corn as it is popped and to retain therein the popped corn in separated relation to the popping charge in said well, and an electric heating element serving, when energized, to transmit heat to the popping charge, to raise the temperature of said popping charge to a corn popping temperature, and to effect further increase in the temperature of the popping charge as the mass of popping charge decreases, the said popping charge being characterized by a progressively decreasing mass within said well, after the initial mass of popping charge has reached popping temperature, because of self-removal of corn and absorbed cooking oil from said well as a result of the corn-popping action; and a thermostatic control for said heating element, responsive primarily to the temperature of the diminishing mass of popping charge in said well, for anticipating the time of complete removal of popping charge from said well and for terminating energization of said heating element prior to complete removal of the popping charge from the well, to prevent subsequent burning of the popped corn, while the residual heat from the heating element and in the popping charge effects the popping of the last portion of the popping charge in the well, and said thermostatic control including a temperature responsive element engaging the bottom of the well and being clamped under pressure thereagainst so that said temperature responsive element will effectively partake of the temperature of the mass of the popping charge in the well, the said well having very low thermal lag and thermal absorption, so that the temperature of the popping charge is readily transmitted to said thermostatic control.

12. An automatic electrical corn popping appliance for properly popping, without burning, one or a consecutive series of popping charges, consisting of preselected amounts of cooking oil and corn, and without regard to the initial temperature of the appliance into which any popping charge is introduced; said automatic corn popping appliance comprising, in combination: a corn popping container including a reduced well at the bottom of the container for receiving therein the popping charge, a popped-corn receiving portion of much greater volume than the volume of said well located above the well and being shaped and arranged relative to said well to receive the corn as it is popped and to retain therein the popped corn in separated relation to the popping charge in said well, and an electric heating element serving, when energized, to transmit heat to the popping charge, to raise the temperature of said popping charge to a corn popping temperature, and to effect further increase in the temperature of the popping charge as the mass of popping charge decreases, the said popping charge being characterized by a progressively decreasing mass within said well, after the initial mass of popping charge has reached popping temperature, because of self-removal of corn and absorbed cooking oil from said well as a result of the corn-popping action; and a thermostatic control for said heating element, responsive primarily to the temperature of the diminishing mass of popping charge in said well, for anticipating the time of complete removal of popping charge from said well and for terminating energization of said heating element prior to complete removal of the popping charge from the well, to prevent subsequent burning of the popped corn, while residual heat from the heating element and in the popping charge effects the popping of the last portion of the popping charge in the well, and said thermostatic control being operative to terminate energization of said heating element, in response to a perdetermined increase in the popping charge temperature because of a reduction in popping charge mass, when substantially two-thirds of the popping charge has been popped upwardly out of the well of the popping container.

References Cited in the file of this patent

UNITED STATES PATENTS

| | | |
|---|---|---|
| 2,027,698 | Parks et al. | Jan. 14, 1936 |
| 2,189,127 | Brannon | Feb. 6, 1940 |
| 2,194,852 | Gundelfinger et al. | Mar. 26, 1940 |
| 2,216,805 | Case | Oct. 8, 1940 |
| 2,248,812 | Cretors | July 8, 1941 |
| 2,312,555 | Jepson | Mar. 2, 1943 |
| 2,537,167 | Snyder | Jan. 9, 1951 |
| 2,690,709 | Farr et al. | Oct. 5, 1954 |
| 2,696,159 | Marquis | Dec. 7, 1954 |
| 2,742,848 | Case | Apr. 24, 1956 |
| 2,802,921 | Miklas | Aug. 13, 1957 |

FOREIGN PATENTS

| | | |
|---|---|---|
| 1,016 | Australia | Nov. 19, 1931 |